(12) United States Patent
Jeong

(10) Patent No.: US 6,211,847 B1
(45) Date of Patent: Apr. 3, 2001

(54) APPARATUS AND METHOD FOR CONTROLLING SUB MONITORS IN VIDEO COMMUNICATION SYSTEM

(75) Inventor: Seong-Gon Jeong, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/901,320

(22) Filed: Aug. 21, 1997

(30) Foreign Application Priority Data

Aug. 21, 1996 (KR) .................................................. 96-34772

(51) Int. Cl.⁷ ....................................................... G09G 5/00
(52) U.S. Cl. ................................................. 345/1; 348/563
(58) Field of Search ........................... 345/1, 2; 348/552, 348/563, 575, 474; 434/705, 322, 350, 352

(56) References Cited

U.S. PATENT DOCUMENTS

| 4,759,717 | * | 7/1988 | Larochelle et al. | 434/350 |
| 4,907,146 | * | 3/1990 | Caporali | 434/350 |
| 5,318,450 | * | 6/1994 | Carver | 434/350 |
| 5,508,713 | * | 4/1996 | Okouchi | 345/1 |
| 5,574,574 | * | 11/1996 | Kawamuea . | |

FOREIGN PATENT DOCUMENTS 0 279 558 * 8/1988 (EP) .

* cited by examiner

Primary Examiner—Regina Liang
(74) Attorney, Agent, or Firm—Robert E. Bushnell, Esq.

(57) ABSTRACT

An apparatus and a method for controlling a plurality of sub monitors in a video communication system in which the same signal from a host computer or a video tape recording/reproducing device is displayed on screens of the sub monitors and a main monitor to which the sub monitors are connected in series. The control apparatus comprises a plurality of communication devices included respectively in the main and sub monitors, for serially transferring control data from a host computer to the main and sub monitors and response data from the main and sub monitors to the host computer, and a plurality of microcomputers connected respectively to the communication devices, for setting up a corresponding one of the main and sub monitors in response to the control data from the host computer when the control data from the host computer is for the control of the corresponding monitor and transferring the control data from the host computer to the subsequent sub monitor when the control data from the host computer is not for the control of the corresponding monitor. According to the present invention, the host computer can control the plurality of sub monitors using the communication devices therein and a program for the control thereof.

12 Claims, 7 Drawing Sheets

Fig. 7

| GENERAL CONTROL | COLOR CONTROL | AUDIO CONTROL | DPMS CONTROL |
|---|---|---|---|
| DEGAUSING<br>SIDE-PIN<br>TRAP<br>PARA<br>H-PHASE<br>V- LIN<br>V- CENTER<br>H- SIZE<br>S- CORRECT | R- GAIN<br>G- GAIN<br>B- GAIN<br>R- CUTOFF<br>G- CUTOFF<br>B- CUTOFF<br>CONTRAST<br>BRIGHTNESS | MAIN- VR<br>BALANCE<br>BASS<br>TREBLE<br>MUTE | POWER-ON<br>POWER-OFF<br>POWER-STAND BY<br>POWER-SUSPEND |

APPARATUS AND METHOD FOR CONTROLLING SUB MONITORS IN VIDEO COMMUNICATION SYSTEM

CLAIM OF PRIORITY

This application makes reference to, incorporates the same herein, and claims all benefits accruing under 35 U.S.C §119 from an application entitled Apparatus And Method For Controlling Sub Monitors In Video Communication System earlier filed in the Korean Industrial Property Office on Aug. 21, 1997, and there duly assigned Ser. No. 96-34772 by that Office.

BACKGROUND OF THE INVENTION

1. Field of the Invention

The present invention relates in general to controlling monitors in a video communication system, and more particularly to an apparatus and a method for controlling a plurality of sub monitors in a video communication system, in which a host computer controls functions of the sub monitors using communication devices therein and a program for the control thereof.

2. Description of the Prior Art

Generally, a monitor is connected to a television receiver, a video tape recording/reproducing device or a host computer, for processing an output signal therefrom to display it on a screen thereof.

Connected to one monitor may be another monitor for sharing output data from the television receiver, video tape recording/reproducing device or host computer therewith.

In a conventional video communication system a host computer is connected to a main monitor, an output terminal of which is connected to an input terminal of a first sub monitor; an output terminal of the first sub monitor is connected to an input terminal of a second sub monitor, etc.; and an output terminal of the last sub monitor is connected to an input terminal of the main monitor. As a result, the same video signal from the host computer is displayed on the screens of all the main and sub monitors so that it can be viewed by the video communication system users. On the other hand, a video tape recording/reproducing device is not limited to use with only the main monitor, but it may be connected to any one of the main and sub monitors so that the same video signal therefrom can be displayed on the screens of all the main and sub monitors.

The sub monitors may be used in a conference place. When the conference place is large, conferees have a limitation in viewing data using an overhead projector. Further, a device with a large screen is high in cost. For these reasons, the use of personal sub monitors is advantageous when considering the size of the conference place and cost.

However, such video communication system has a disadvantage in that the sub monitor users control their sub monitors individually. Accordingly, it is necessary to provide a manager to manage the video communication system, and he/she will personally check and control many sub monitors. As a result, the video communication system is inconvenient to manage.

SUMMARY OF THE INVENTION

Therefore, the present invention has been made in view of the above problems, and it is an object of the present invention to provide an apparatus and a method for controlling a plurality of sub monitors in a video communication system, in which a communication device is provided in each of the sub monitors to perform communication between the corresponding sub monitor and a host computer, and a microcomputer is provided in each of the sub monitors to control the corresponding sub monitor in response to output data from the communication device according to a control program therein, so that the sub monitors can be controlled by the host computer.

In accordance with one aspect of the present invention, there is provided an apparatus for controlling a plurality of sub monitors in a video communication system in which the same signal from a host computer or a video tape recording/reproducing device is displayed on screens of the sub monitors and a main monitor to which the sub monitors are connected in series, comprising a plurality of communication means included respectively in the main and sub monitors, for serially transferring control data from a host computer to the main and sub monitors and response data from the main and sub monitors to the host computer; and a plurality of microcomputers connected respectively to the communication means, for setting up a corresponding one of the main and sub monitors in response to the control data from the host computer when the control data from the host computer is for the control of the corresponding monitor and transferring the control data from the host computer to the subsequent sub monitor when the control data from the host computer is not for the control of the corresponding monitor.

In accordance with another aspect of the present invention, there is provided a method for controlling a plurality of sub monitors in a video communication system in which the same signal from a host computer or a video tape recording/reproducing device is displayed on screens of the sub monitors and a main monitor to which the sub monitors are connected in series, comprising the first step of checking states of the sub monitors on the screen of the main monitor and transferring control data from the host computer to a desired one of the sub monitors to control it; and the second step of selecting and setting up the desired sub monitor in response to the control data transferred at the first step.

BRIEF DESCRIPTION OF THE DRAWINGS

The above and other objects, features and advantages of the present invention will be more clearly understood from the following detailed description taken in conjunction with the accompanying drawings, in which:

FIG. 7 is a table illustrating control functions of the sub monitors according to the principles of the present invention.

DETAILED DESCRIPTION OF THE PREFERRED EMBODIMENTS

Figure 1:
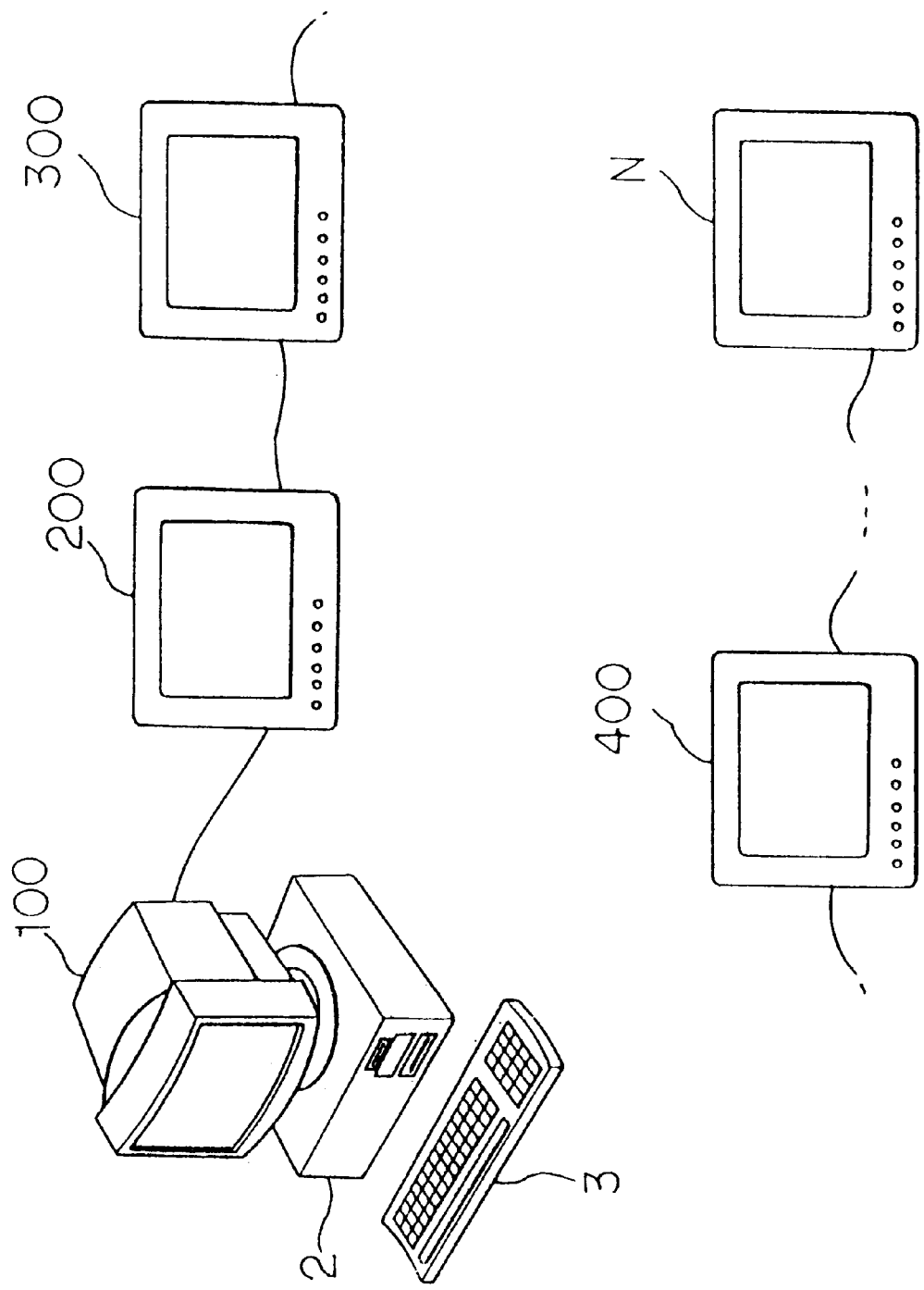
FIG. 1 is a block diagram illustrating the construction of a video communication system.

FIG. 1 is a block diagram illustrating the construction of a video communication system. As shown in this drawing, a host computer 2 is connected to a main monitor 100, an output terminal of which is connected to an input terminal of a sub monitor 200. An output terminal of sub monitor 200 is connected to an input terminal of a subsequent sub monitor 300. An output terminal of a last sub monitor N in the series is connected to an input terminal of main monitor 100. As a result, the same video signal from host computer 2 is displayed on the screens of all the main and sub monitors 100, 200, . . . , N so that it can be viewed by the video communication system users. On the other hand, connection to a video tape recording/reproducing device 1 (see FIG. 2) is not limited to main monitor 100, but it may be connected to any one of the main and sub monitors 100, 200, . . . , N so that the same video signal therefrom can be displayed on the screens of all the main and sub monitors 100, 200, . . . , N.

Figure 2:
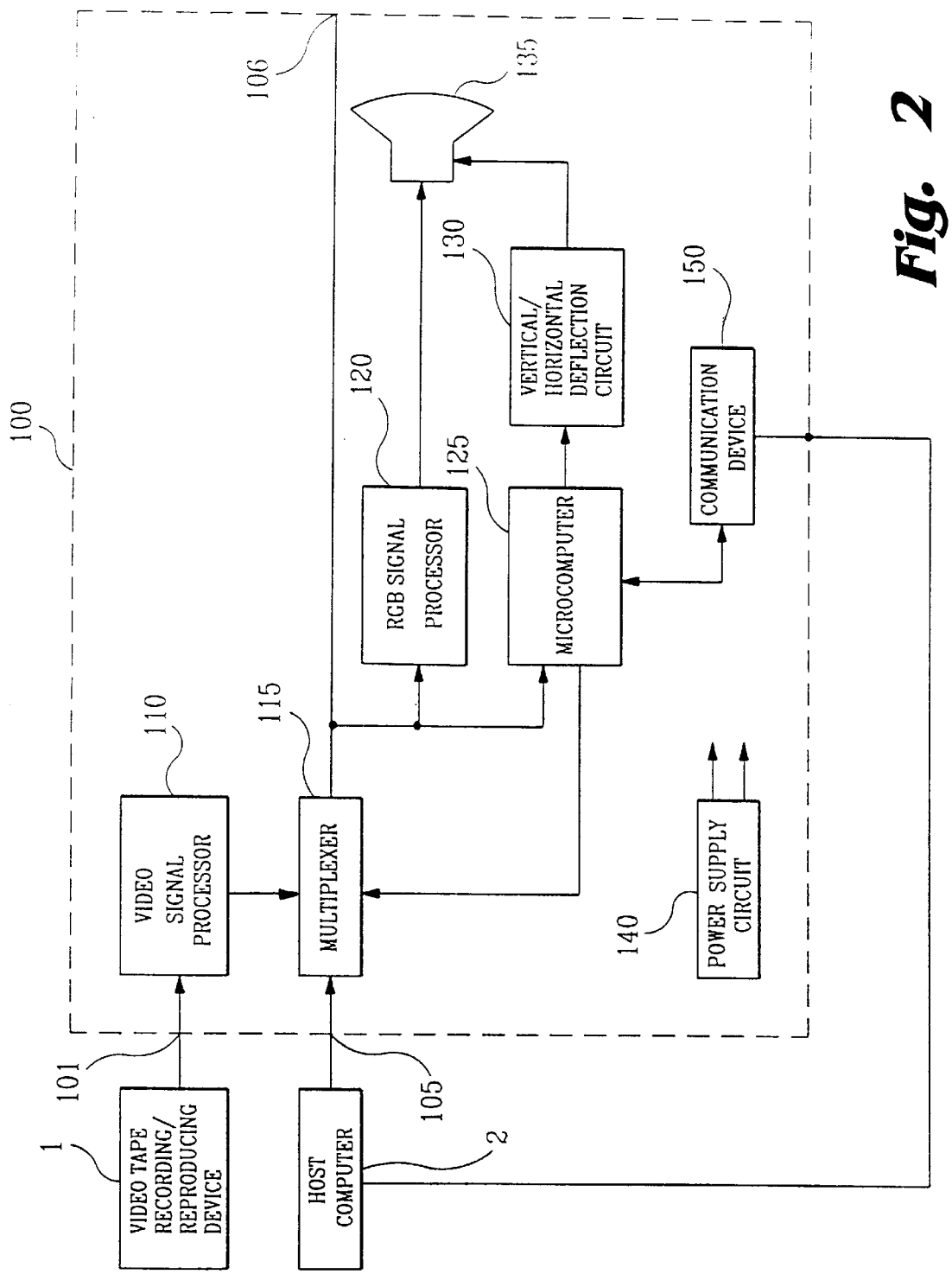
FIG. 2 is a block diagram illustrating the construction of a main monitor in FIG. 1.

FIG. 2 is a block diagram illustrating the construction of main monitor 100 in FIG. 1. As shown in this drawing, main monitor 100 comprises a video signal processor 110 for separating a video signal from video tape recording/reproducing device 1 into red (R), green (G) and blue (B) signals, vertical synchronous signals and horizontal synchronous signals, and a multiplexer 115 for selecting an output signal from video signal processor 110 or an output signal from host computer 2 in response to a selection signal.

A microcomputer 125 is adapted to output the selection signal to multiplexer 115. Also, microcomputer 125 recognizes a monitor mode in response to the vertical and horizontal synchronous signals from multiplexer 115 and outputs control signals based on the recognized monitor mode.

An RGB signal processor 120 is adapted to process the RGB signals from multiplexer 115 to display them on a cathode ray tube (CRT) 135. A vertical/horizontal deflection circuit 130 is adapted to adjust horizontal position and size, vertical position and size, a side cushion and a tilt of main monitor 100 in response to the control signals from microcomputer 125. A communication device 150 is adapted to transfer monitor environment control data from host computer 2 to microcomputer 125. Microcomputer 125 sets up main monitor 100 in response to the transferred monitor environment control data.

The output signal from multiplexer 115 is also transferred to an input terminal of sub monitor 200 through an output terminal 106.

Noticeably, sub monitors 200, . . . , N are the same in construction as main monitor 100, with the exception that they do not comprise communication device 150. With the above construction, the same video signal is displayed on the screens of all the main and sub monitors 100, 200, . . . , N. The reference numeral 140, not described, designates a power supply circuit which converts an external input alternating current (AC) voltage into direct current (DC) voltages of various levels necessary to main monitor 100 and supplies the converted DC voltages to main monitor 100.

Figure 3:
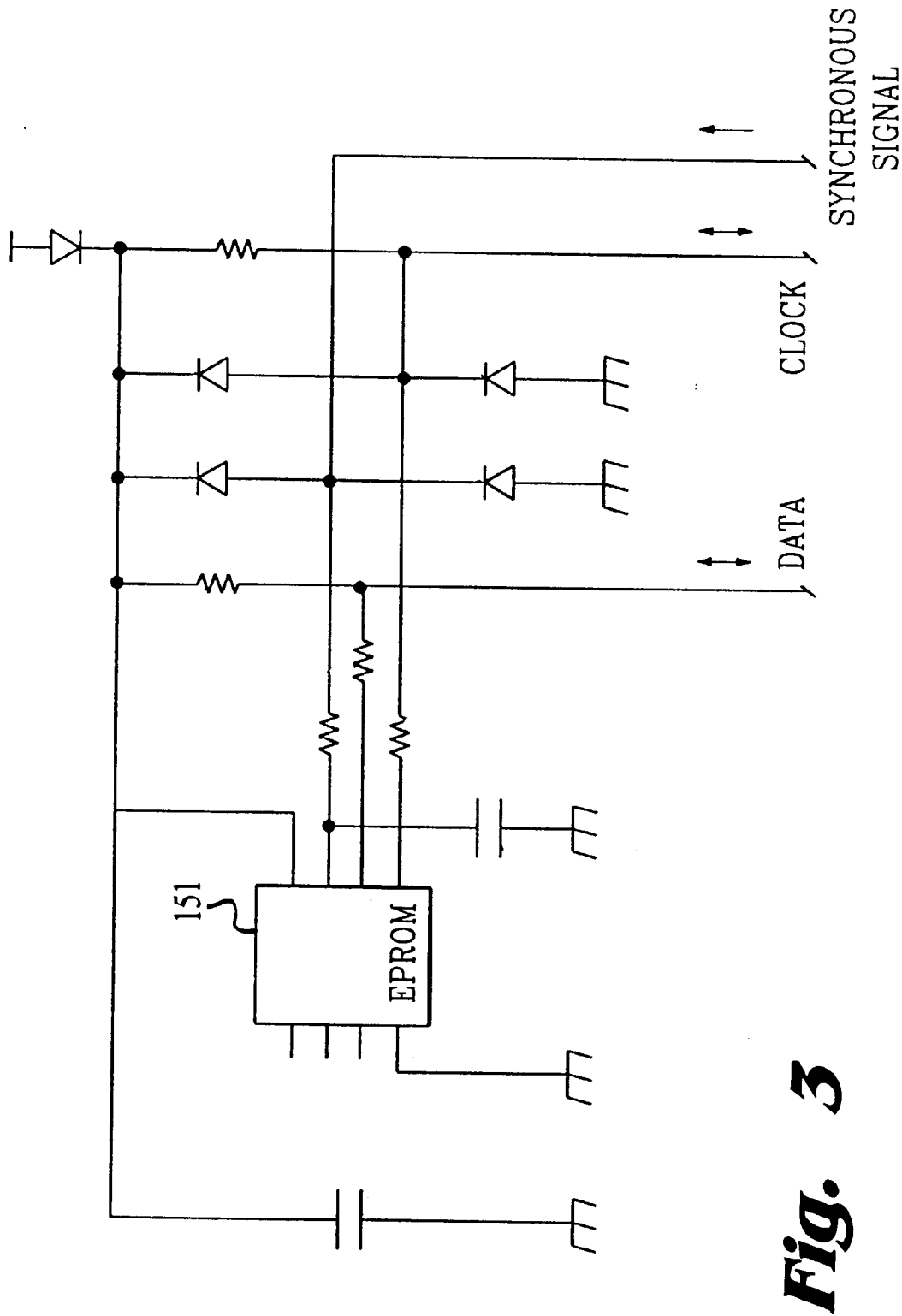
FIG. 3 is a detailed circuit diagram illustrating the construction of a communication device in FIG. 2.

FIG. 3 is a detailed circuit diagram illustrating the construction of communication device 150 in FIG. 2. Communication device 150 is typically composed of a data display channel (DDC).

When the host computer 2 and main monitor 100 are powered on, communication device 150 transfers various monitor specification data stored in a memory 151 of monitor 100 to host computer 2. Host computer 2 transfers control data to communication device 150 in response to the monitor specification data to control main monitor 100.

In other words, communication device 150 performs bi-directional communication between host computer 2 and main monitor 100, and memory 151 of main monitor 100 stores the contents regarding a monitor resolution, such as synchronous signal frequency values, color coordinates and standard timing.

The construction of communication device 150 is well known in the art and a detailed description thereof will thus be omitted.

Figure 4:
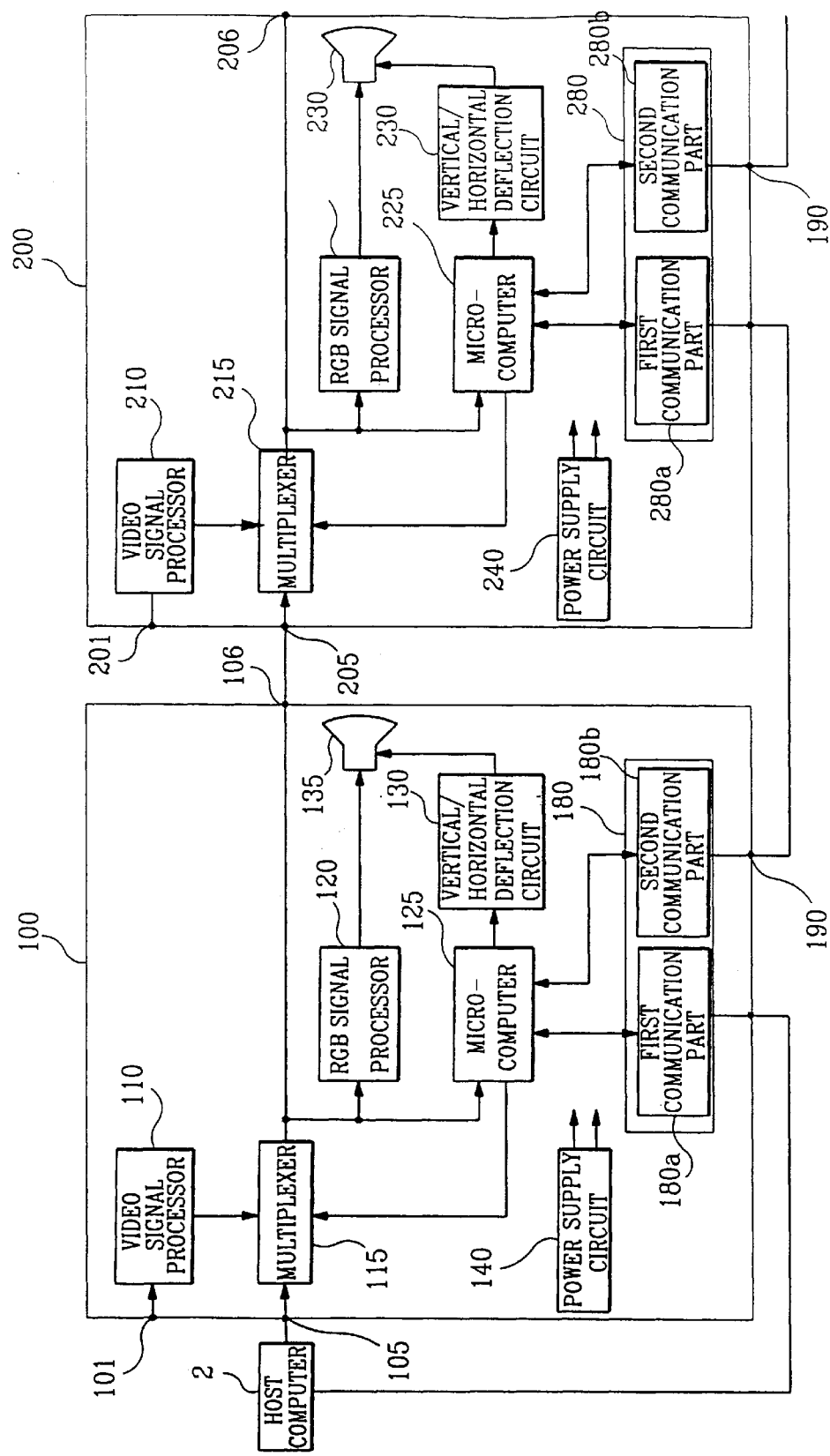
FIG. 4 is a block diagram illustrating the construction of main and sub monitors in accordance with the principles of the present invention.

FIG. 4 is a block diagram illustrating the construction of main and sub monitors in accordance with the present invention. Some parts in this drawing are the same as those in FIG. 2. Therefore, like reference numerals designate like parts and a detailed description thereof will thus be omitted.

As shown in FIG. 4, main monitor 100 comprises video signal processor 110, multiplexer 115, RGB signal processor 120, vertical/horizontal deflection circuit 130 and power supply circuit 140. Microcomputer 125 is adapted to output the selection signal to multiplexer 115. Also, microcomputer 125 recognizes a monitor mode in response to the vertical and horizontal synchronous signals from multiplexer 115 and outputs control signals based on the recognized monitor mode to vertical/horizontal deflection circuit 130. Further, microcomputer 125 controls main monitor 100 in response to control data from host computer 2 and outputs response data to host computer 2. Also, microcomputer 125 transfers the control data from host computer 2 to sub monitor 200 and response data from sub monitor 200 to host computer 2. A communication device 180 is provided with a first communication part 180a for performing communication between host computer 2 and microcomputer 125, and a second communication part 180b for performing communication between microcomputer 125 and sub monitor 200.

In accordance with the preferred embodiment of the present invention, sub monitors 200, . . . , N are connected in series to main monitor 100 and the construction thereof is the same as that of main monitor 100.

Figure 5:
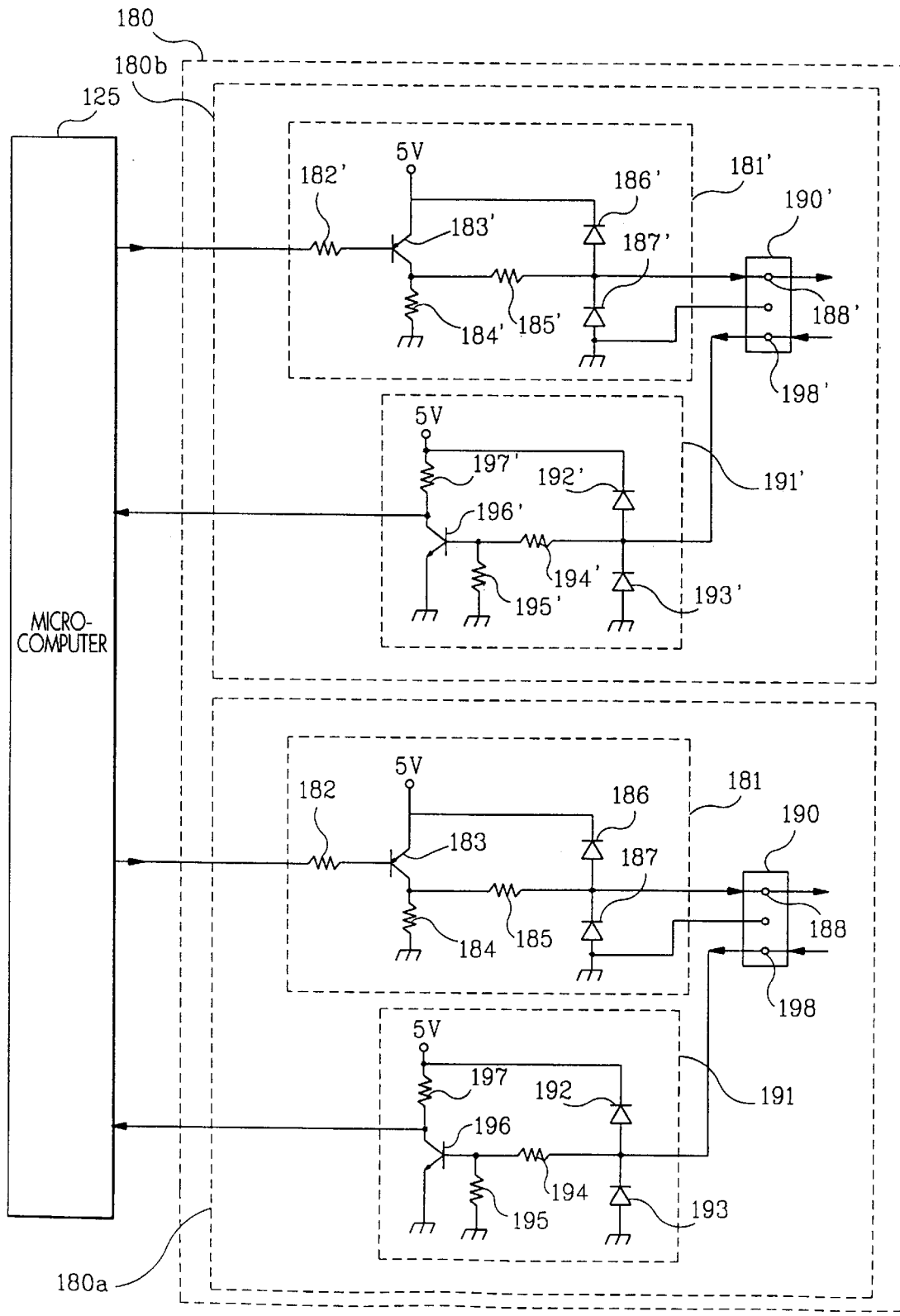
FIG. 5 is a detailed circuit diagram illustrating the construction of a communication device in FIG. 4.

FIG. 5 is a detailed circuit diagram illustrating the construction of communication device 180 in FIG. 4. Preferably, communication device 180 forms a display communication management system (DCMS).

As shown in FIG. 5, first communication part 180a includes a first buffer 181 for transferring the response data from microcomputer 125 to host computer 2, and a second buffer 191 for transferring the control data from host computer 2 to microcomputer 125. Second communication part 180b includes a third buffer 181' for transferring the control data from microcomputer 125 to sub monitor 200, and a fourth buffer 191' for transferring the response data from sub monitor 200 to microcomputer 125. A connector 190 has a first output terminal 188 for transferring the response data from first buffer 181 to host computer 2, a second output terminal 188' for transferring the control data from third buffer 181' to sub monitor 200, a first input terminal 198 for transferring the control data from host computer 2 to second buffer 191, and a second input terminal 198' for transferring the response data from sub monitor 200 to fourth buffer 191'.

First buffer 181 includes a current amplification transistor 183, bias/transistor protection diodes 186 and 187 and resistors 182, 184 and 185. Resistor 182 has one side connected to a first output terminal of microcomputer 125, resistor 184 has one side connected to a ground voltage terminal, and resistor 185 has one side connected to first output terminal 188 of connector 190. Current amplification transistor 183 has a base connected to the other side of resistor 182, an emitter connected to a supply voltage terminal of 5V and a collector connected in common to the other sides of resistors 184 and 185. Bias/transistor protection diode 186 has an anode connected to a connection node between resistor 185 and first output terminal 188 of connector 190 and a cathode connected to a connection point of the supply voltage terminal and the emitter of transistor 183. Bias/transistor protection diode 187 has an anode connected to the ground voltage terminal and a cathode connected to the connection node between resistor 185 and first output terminal 188 of connector 190.

Second buffer 182 includes a current amplification transistor 196, bias/transistor protection diodes 192 and 193 and resistors 194, 195 and 197. Resistor 197 has one side connected to the supply voltage teal, resistor 194 has one side connected to first input terminal 198 of connector 190, and resistor 195 has one side connected to the ground voltage terminal. Current amplification transistor 196 has abase connected in common to the other sides of resistors 194 and 195, an emitter connected to the ground voltage terminal and a collector connected in common to the other side of resistor 197 and a first input terminal of microcomputer 125. Bias/transistor protection diode 192 has an anode connected to a connection node between first input terminal 198 of connector 190 and resistor 194 and a cathode connected to a connection node between the supply voltage terminal and the collector of transistor 196. Bias/transistor protection diode 193 has an anode connected to the ground voltage terminal and a cathode connected to the connection node between first input terminal 198 of connector 190 and resistor 194.

Third buffer 181' includes a current amplification transistor 183', bias/transistor protection diodes 186' and 187' and resistors 182', 184' and 185'. Resistor 182' has one side connected to a second output terminal of microcomputer 125, resistor 184' has one side connected to the ground voltage terminal, and resistor 185' has one side connected to second output terminal 188' of connector 190'. Current amplification transistor 183' has a base connected to the other side of resistor 182', an emitter connected to the supply voltage terminal of 5V and a collector connected in common to the other sides of resistors 184' and 185'. Bias/transistor protection diode 186' has an anode connected to a connection node between resistor 185' and second output terminal 188' of connector 190' and a cathode connected to a connection node between the supply voltage terminal and the emitter of transistor 183'. Bias/transistor protection diode 187' has an anode connected to the ground voltage terminal and a cathode connected to the connection node between resistor 185' and second output terminal 188' of connector 190'. Fourth buffer 182' includes a current amplification transistor 196', bias/transistor protection diodes 192' and 193' and resistors 194', 195' and 197'. Resistor 197' has one side connected to the supply voltage terminal, resistor 194' has one side connected to second input terminal 198' of connector 190', and resistor 195' has one side connected to the ground voltage terminal. Current amplification transistor 196' has a base connected in common to the other sides of resistors 194' and 195', an emitter connected to the ground voltage terminal and a collector connected in common to the other side of resistor 197' and a second input terminal of microcomputer 125. Bias/transistor protection diode 192' has an anode connected to a connection node between second input terminal 198' of connector 190' and resistor 194' and a cathode connected to a connection node between the supply voltage terminal and the collector of transistor 196'. Bias/transistor protection diode 193' has an anode connected to the ground voltage terminal and a cathode connected to the connection node between second input terminal 198' of connector 190' and resistor 194'.

As mentioned above, because main and sub monitors 100, 200, . . . , N are the same in construction, the construction of the communication device 180 in FIG. 5 is similarly applied to all sub monitors 200, . . . , N. The data transfer between main and sub monitors 100 and 200 will hereinafter be described with reference to FIG. 5.

For example, when host computer 2 outputs a logical value "0" to first input terminal 198 of communication device 180, transistor 196 in second buffer 191 is turned off, thereby causing a voltage of 5V from the supply voltage terminal to be applied to the first input terminal of microcomputer 125.

Then, microcomputer 125 recognizes the control data from host computer 2 and thus outputs a logical value "1" to communication device 180 at its second output terminal, thereby causing transistor 183' in third buffer 181' to be turned off. As transistor 183' in third buffer 181' is turned off, the logical value "0" is output through second output terminal 188' of connector 190' to communication device 280 in sub monitor 200. As a result, the output logical value "0" from host computer 2 is transferred to microcomputer 225 in sub monitor 200 through communication device 280.

Then, the response data from microcomputer 225 in sub monitor 200 is transferred to second input terminal 198' of communication device 180 in main monitor 100 through communication device 280 in sub monitor 200. Fourth buffer 191' transfers the response data at second input terminal 198' of connector 190' to the second input terminal of microcomputer 125. As a result, microcomputer 125 outputs the received response data to first buffer 181 at its first output terminal. First buffer 181 transfers the response data from microcomputer 125 to host computer 2 through first output terminal 188 of the connector 190.

In this manner, the host computer can individually control the sub monitors in the conference place using the communication devices.

Figure 6:
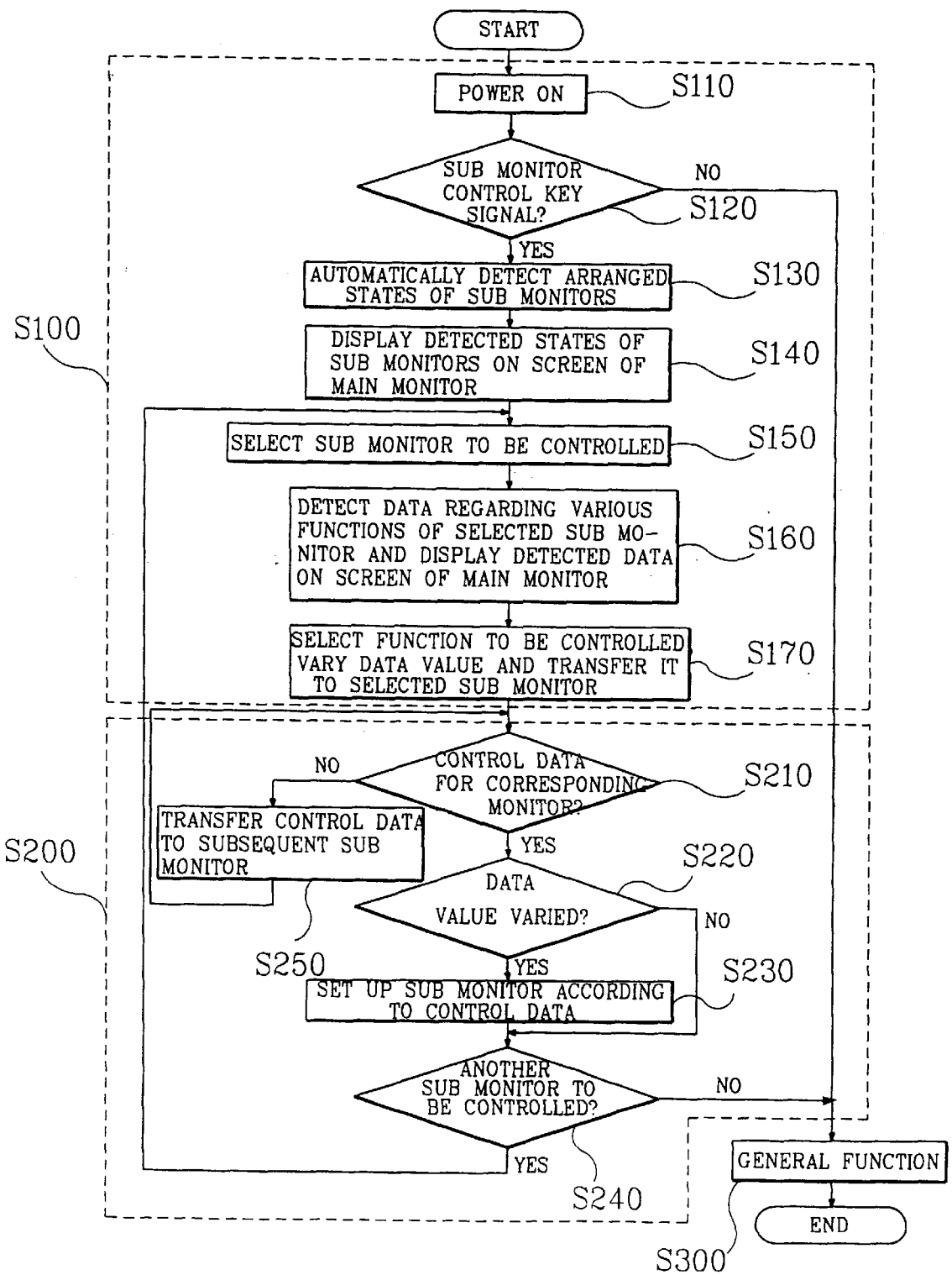
FIG. 6 is a flowchart illustrating a method for controlling a plurality of sub monitors in a video communication system using a host computer in accordance with the principles of the present invention.

FIG. 6 is a flowchart illustrating a method for controlling a plurality of sub monitors in a video communication system using host computer 2 in accordance with the present invention.

First, the monitor power state will be mentioned before describing the monitor control method. The monitor power off state is not a complete off state but a suspend state. For this reason, the minimum operation power is applied to microcomputer 125 in main monitor 100.

Upon receiving a power control signal from host computer 2 through the communication device 180, microcomputer 125 controls power supply circuit 140 to control the entire power of main monitor 100. The power states of all sub monitors 200, . . . , N are the same as that of main monitor 100.

A communication device (not shown) of host computer 2 is connected to communication device 180 of main monitor 100 to transfer sub monitor control data from host computer 2 to microcomputer 125. Then, microcomputer 125 transfers the received control data to communication device 280 of sub monitor 200 through the communication device 180 of main monitor 100.

Communication device 280 of sub monitor 200 transfers the control data from main monitor 100 to microcomputer 225 of sub monitor 200. Microcomputer 225 then transfers the received control data to the communication device of another sub monitor 300, connected in series to sub monitor 200, through communication device 280.

In this manner, the data transfer is performed between host computer 2 and the sub monitors.

Now, the method for controlling sub monitors 200, 300, ..., N connected in series to main monitor 100 using host computer 2 will be mentioned in detail with reference to FIG. 6.

For example, assume that host computer 2 will control the power of sub monitor 200 and the volume of another sub monitor 400. First, when host computer 2 and main monitor 100 are powered on at step S110, a general function message regarding host computer 2 and sub monitor control messages for controlling one or more of said sub monitors are displayed on the screen of main monitor 100. In this case, host computer 2 selects the displayed sub monitor control message corresponding to a desire to control two of the sub monitors under the control of the operator using a keyboard 3 at step S120.

Then, host computer 2 automatically detects the arranged (established or current) states of sub monitors 200, 300, 400, ..., N using communication devices 180, 280, ..., at step S130 and displays the detected states on the screen of main monitor 100 at step S140.

Host computer 2 selects a first desired one (for example, 200) of the sub monitors 200, ..., N displayed on the screen of main monitor 100 under the control of the operator using the keyboard 3 at step S150. Then, control functions of selected sub monitor 200, as shown in FIG. 7, are displayed on the screen of main monitor 100.

When a power control function is selected among the displayed functions, the current power state of the selected sub monitor 200 is displayed on the screen of main monitor 100 at step S160. Then, host computer 2 transfers control data to microcomputer 125 through communication device 180 of main monitor 100 under the control of the operator at step S170 to power on sub monitor 200.

Upon receiving the control data from host computer 2, microcomputer 125 checks at step S210 whether the received control data is for the control of main monitor 100. If it is determined at step S210 that the received control data is not for the control of main monitor 100, microcomputer 125 transfers the received control data to communication device 280 of sub monitor 200 through communication device 180 at step S250.

Microcomputer 225 in sub monitor 200 receives the control data from microcomputer 125 in main monitor 100 through communication devices 180 and 280 and checks at step S210 whether the received control data is for the control of sub monitor 200. When it is determined in S210 that the received control data is for the control of sub monitor 200, microcomputer 225 loads the power state of sub monitor 200 and transfers the response data to host computer 2 through the communication devices 280 and 180. Then, host computer 2 displays the response data from microcomputer 225 on the screen of main monitor 100.

Then, the microcomputer 225 checks at step S220 whether the received control data is different from set-up data. If it is determined in step S220 that the received control data is different from the set-up data, microcomputer 225 controls power supply circuit 240 in sub monitor 200 according to the received control data at step S230 to power on sub monitor 200.

After controlling the power-on function of sub monitor 200, host computer 2 checks at step S240 whether another sub monitor is to be controlled, which is dependent upon the selected sub monitor control message selected back at step S120. When it is determined in step S240 that another sub monitor is to be controlled, such as the volume of the sub monitor 400 for example, host computer 2 selects sub monitor 400 under the control of the operator using keyboard 3 at step S150.

The volume of sub monitor 400 is controlled in the same manner as the power of sub monitor 200.

Namely, if the operator selects the sub monitor 400 on the screen of main monitor 100 in step S150, control functions of selected sub monitor 400 are displayed on the screen of main monitor 100 at step S160.

Then, the operator then selects at step S170 a volume control function among the displayed functions to raise or lower the volume of sub monitor 400, and host computer 2 transfers the corresponding control data to microcomputer 125 through communication device 180 of main monitor 100.

Upon receiving the control data from host computer 2, microcomputer 125 checks at step S210 whether the received control data is for the control of main monitor 100. If it is determined in step S210 that the received control data is not for the control of main monitor 100, microcomputer 125 transfers the received control data to communication device 280 of sub monitor 200 through communication device 180 at step S250.

Microcomputer 225 in sub monitor 200 receives the control data from microcomputer 125 in main monitor 100 through communication device 280 and checks at step S210 whether the received control data is for the control of sub monitor 200. When it is determined that the received control data is not for the control of sub monitor 200, microcomputer 225 transfers the received control data to the communication device of sub monitor 300 through communication device 280 at step S250. In this manner, the control data from host computer 2 is subsequently transferred to the microcomputer of sub monitor 400, which then sets up sub monitor 400 again according to the received control data.

When host computer 2 does not select the sub monitor control message on the screen of main monitor 100 at step S120 or determines in step S240 that another sub monitor is not to be controlled, host computer performs the general function at step S300.

Noticeably, host computer 2 displays the arranged states, functions and associated data of the sub monitors in an on screen display manner. The sub monitors are automatically detected or set to their inherent numbers for the check on the arranged states thereof.

Control reference values of the sub monitors are previously set in a manufacturing process. When the operator selects a desired one of the sub monitors and a control function thereof, the control reference values are displayed on the screen of the main monitor. The operator checks the displayed control reference values and selects a desired one of them. Then, the operator applies the selected value to the host computer using a computer input unit to control the selected sub monitor.

In this manner, the host computer can control all the sub monitors.

The computer input unit may be from a keyboard, a mouse and etc.

FIG. 7 is a table illustrating functions of the sub monitors controllable by host computer 2. As shown in this drawing, the control functions of the sub monitors are classified into general, color, audio and power control functions.

The general control function is to control degaussing, side-pin, trap, horizontal synchronous signal phase H-PHASE, vertical synchronous signal line V-LINE, vertical synchronous signal center V-CENTER, horizontal synchronous signal size H-SIZE and S-correction S-CORRECT.

The color control function is to control RGB gains R-GAIN, G-GAIN and B-GAIN, RGB cutoff R-CUTOFF, G-CUTOFF and B-CUTOFF, contrast and brightness.

The audio control function is to control main volume MAIN-VR, balance, bass, treble and mute.

The power control function is to control power-on, power-off, power-standby and power-suspend.

As mentioned above, because the sub monitors have the communication functions, they can be controlled by the host computer under the control of the operator.

As apparent from the above description, according to the present invention, the host computer can control the plurality of sub monitors using the communication devices therein and the program for the control thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a plurality of sub monitors in a video communication system in which the same signal from a host computer or a video tape recording/reproducing device is displayed on screens of said sub monitors and a main monitor to which said sub monitors are connected in series, comprising:

a plurality of communication means included respectively in said main and sub monitors, for serially transferring control data from a host computer to said main and sub monitors and response data from said main and sub monitors to said host computer; and a plurality of microcomputers, included respectively in said main and sub monitors and connected respectively to said communication means, for setting up a corresponding one of said main and sub monitors in response to the control data from said host computer when the control data from said host computer is for the control of the corresponding monitor and transferring the control data from said host computer to the subsequent sub monitor when the control data from said host computer is not for the control of the corresponding monitor, wherein each of said communication means comprises:

first buffering means for transferring the response data from a corresponding one of said microcomputers to said host computer;

second buffering means for transferring the control data from said host computer to the corresponding microcomputer;

third buffering means for transferring the control data from the corresponding microcomputer to the subsequent sub monitor;

fourth buffering means for transferring the response data from the subsequent sub monitor to the corresponding microcomputer; and a connector having a first output terminal for transferring the response data from said first buffering means to said host computer, a second output terminal for transferring the control data from said third buffering means to the subsequent sub monitor, a first input terminal for transferring the control data from said host computer to said second buffering means, and a second input terminal for transferring the response data from the subsequent sub monitor to said fourth buffering means, wherein said first buffering means comprises:

a first resistor having one side connected to an output terminal of the corresponding microcomputer;

a second resistor having one side connected to a ground voltage terminal;

a third resistor having one side connected to said first output terminal of said connector;

a current amplification transistor having a base connected to another side of said first resistor, an emitter connected to a supply voltage terminal and a collector connected in common to another side of said second and third resistors;

a first bias/transistor protection diode having an anode connected to a connection point of said one side of said third resistor and said first output terminal of said connector and a cathode connected to a connection point of said supply voltage terminal and said emitter of said transistor; and a second bias/transistor protection diode having an anode connected to said ground voltage terminal and a cathode connected to said connection point of said one side of said third resistor and said first output terminal of said connector.

2. An apparatus for controlling a plurality of sub monitors in a video communication system, as set forth in claim 1, wherein said second buffering means comprises:

a first resistor having one side connected to a supply voltage terminal;

a second resistor having one side connected to said first input terminal of said connector;

a third resistor having one side connected to a ground voltage terminal;

a current amplification transistor having a base connected in common to another side of said second and third resistors, an emitter connected to said ground voltage terminal and a collector connected in common to another side of said first resistor and an input terminal of the corresponding microcomputer;

a first bias/transistor protection diode having an anode connected to a connection point of said first input terminal of said connector and said one side of said second resistor and a cathode connected to a connection point of said supply voltage terminal and said collector of said transistor; and a second bias/transistor protection diode having an anode connected to said ground voltage terminal and a cathode connected to said connection point of said first input terminal of said connector and said one side of said second resistor.

3. An apparatus for controlling a plurality of sub monitors in a video communication system, as set forth in claim 1, wherein said third buffering means comprises:

a first resistor having one side connected to an output terminal of the corresponding microcomputer;

a second resistor having one side connected to a ground voltage terminal;

a third resistor having one side connected to said second output terminal of said connector;

a current amplification transistor having a base connected to another side of said first resistor, an emitter connected to a supply voltage terminal and a collector connected in common to another side of said second and third resistors;

a first bias/transistor protection diode having an anode connected to a connection point of said one side of said third resistor and said second output terminal of said connector and a cathode connected to a connection point of said supply voltage terminal and said emitter of said transistor; and a second bias/transistor protection diode having an anode connected to said ground voltage terminal and a cathode connected to said connection point of said one side of said third resistor and said second output terminal of said connector.

4. An apparatus for controlling a plurality of sub monitors in a video communication system, as set forth in claim 1, wherein said fourth buffering means comprises:

a first resistor having one side connected to a supply voltage terminal;

a second resistor having one side connected to said second input terminal of said connector;

a third resistor having one side connected to a ground voltage terminal;

a current amplification transistor having a base connected in common to another side of said second and third resistors, an emitter connected to said ground voltage terminal and a collector connected in common to another side of said first resistor and an input terminal of the corresponding microcomputer;

a first bias/transistor protection diode having an anode connected to a connection point of said second input terminal of said connector and said one side of said second resistor and a cathode connected to a connection point of said supply voltage terminal and said collector of said transistor; and a second bias/transistor protection diode having an anode connected to said ground voltage terminal and a cathode connected to said connection point of said second input terminal of said connector and said one side of said second resistor.

5. A method for controlling a plurality of sub monitors in a video communication system in which the same signal from a host computer or a video tape recording/reproducing device is displayed on screens of said sub monitors and a main monitor to which said sub monitors are connected in series, comprising the steps of:

(a) checking states, including a power state and arranged state, of said sub monitors on said screen of said main monitor and transferring control data from said host computer to a desired one of said sub monitors to control it;

(b) selecting and setting up said desired sub monitor in response to the control data transferred at said step (a); and (c) serially transferring control data to a subsequent sub monitor from a previous sub monitor, when said previous sub monitor is not said desired sub monitor.

6. A method for controlling a plurality of sub monitors in a video communication system, as set forth in claim 5, wherein said step (a) comprises the steps of:

(a-1) if said host computer is powered on, checking whether a sub monitor control key signal is inputted;

(a-2) automatically detecting arranged states of said sub monitors if it is checked at said step (a-1) that said sub monitor control key signal is inputted;

(a-3) displaying the arranged states of said sub monitors detected at said step (a-2) on said screen of said main monitor;

(a-4) selecting a desired one of said sub monitors displayed at said step (a-3);

(a-5) detecting data regarding various functions of said selected sub monitor and displaying the detected data on said screen of said main monitor; and (a-6) selecting a desired one of the functions of said selected sub monitor, varying a data value regarding the selected function and transferring the varied data value as the control data to said selected sub monitor through communication means.

7. A method for controlling a plurality of sub monitors in a video communication system, as set forth in claim 6, wherein said step (a) further comprises the step of performing a general function if it is checked at said step (a-1) that said sub monitor control key signal is not inputted.

8. A method for controlling a plurality of sub monitors in a video communication system, as set forth in claim 5, wherein said step (b) comprises the steps of:

(b-1) allowing a first one of said sub monitors to receive the control data transferred at said step (a) and checking whether the received control data is for the control of said first sub monitor;

(b-2) checking whether the received control data is different from set-up data of said first sub monitor, if it is checked at said step (b-1) that the received control data is for the control of said first sub monitor;

(b-3) setting up said first sub monitor according to the received control data if it is checked at said step (b-2) that the received control data is different from the set-up data;

(b-4) checking whether another sub monitor to be controlled is present, after performing said step (b-3); and (b-5) returning to said step (b-1) to select another sub monitor, if it is checked at said step (b-4) that another sub monitor to be controlled is present.

9. A method for controlling a plurality of sub monitors in a video communication system, as set forth in claim 8, wherein said step is performed if it is checked at said step (b-1) that the received control data is not for the control of said first sub monitor.

10. A method for controlling a plurality of sub monitors in a video communication system, as set forth in claim 9, wherein said step (b) further comprises the step of proceeding to said step (b-4) if it is checked at said step (b-2) that the received control data is not different from the set-up data.

11. A method for controlling a plurality of sub monitors in a video communication system utilizing a host computer connected to a main monitor, said main monitor being connected in series to said sub monitors, said method comprising the steps of:

displaying a general function message and sub monitor control messages on a screen of said main monitor upon power up of said host computer and said main monitor;

selecting one of said sub monitor control messages;

detecting, and displaying on said screen of said main monitor, current states, including a power state and arranged state, of each of said sub monitors in response to the selection of said sub monitor control message;

selecting one of said main monitor and said sub monitors to be controlled;

displaying, on said screen of said main monitor, control functions for the selected sub monitor, when one of said sub monitors is selected to be controlled;

selecting one of said control functions and transmitting corresponding control data to the selected sub monitor via a microcomputer of said main monitor and via a microcomputer of any sub monitor serially preceding said selected sub monitor;

determining, at said selected sub monitor, whether said control data is for said selected sub monitor;

determining, at said selected sub monitor, whether said control data is different from set-up data of said selected sub monitor after determining said control data is for said selected sub monitor;

setting up said selected sub monitor according to said control data when it is determined that said control data is different from set-up data of said selected sub monitor;

determining whether another of said sub monitors is to be controlled by said host computer when it is determined that said control data is not different from said set-up data of said selected sub monitor or after completing said setting up step; and returning to said step of selecting one of said sub monitors to be controlled to select another one of said sub monitors when it is determined that another of said sub monitors is to be controlled.

12. The method as set forth in claim 11, further comprising the steps of:

checking at said main monitor whether said control data is for said main monitor;

transferring said control data to a subsequent sub monitor when it is determined in said main monitor that said control data is not for said main monitor;

checking at said subsequent sub monitor whether said control data is for said subsequent sub monitor; and repeating said steps of transferring said control data to a subsequent sub monitor and checking at said subsequent sub monitor until said step of checking at said subsequent sub monitor results in determining said control data is for said selected sub monitor.

* * * * *